(12) United States Patent
Tetsumoto et al.

(10) Patent No.: US 7,993,572 B2
(45) Date of Patent: Aug. 9, 2011

(54) SCREW CONVEYOR AND OPERATION CONTROL METHOD FOR THE SAME

(75) Inventors: Masahiko Tetsumoto, Kobe (JP); Sumito Hashimoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 249 days.

(21) Appl. No.: 11/719,829

(22) PCT Filed: Sep. 2, 2005

(86) PCT No.: PCT/JP2005/016107
§ 371 (c)(1),
(2), (4) Date: May 21, 2007

(87) PCT Pub. No.: WO2006/054381
PCT Pub. Date: May 26, 2006

(65) Prior Publication Data
US 2009/0145725 A1 Jun. 11, 2009

(30) Foreign Application Priority Data

Nov. 19, 2004 (JP) ................................. 2004-336029

(51) Int. Cl.
*B65G 33/10* (2006.01)
(52) U.S. Cl. .............................. 266/44; 266/78; 266/177
(58) Field of Classification Search .................... 266/78, 266/176, 177, 44
See application file for complete search history.

(56) References Cited

U.S. PATENT DOCUMENTS

| 3,536,977 | A | * | 10/1970 | Porter | 318/461 |
| 3,722,660 | A | * | 3/1973 | Snead | 177/16 |
| 6,251,161 | B1 | | 6/2001 | Tateishi et al. | |
| 7,134,350 | B2 | * | 11/2006 | Conrads et al. | 73/863.91 |

FOREIGN PATENT DOCUMENTS

| JP | 58 224907 | 12/1983 |
| JP | 59-10807 | 1/1984 |
| JP | 59 10807 | 1/1984 |
| JP | 5-16141 | 1/1993 |
| JP | 08 026453 | 1/1996 |
| JP | 11-292259 | 10/1999 |
| JP | 2001-133165 | 5/2001 |

(Continued)

OTHER PUBLICATIONS

L. M. Pietrovskii, "Electric Machines", Moscow-Leningrad, The State Energy Publishing House, 1963, pp. 295-297, 312-313, 320-321.

(Continued)

*Primary Examiner* — Scott Kastler
(74) *Attorney, Agent, or Firm* — Oblon, Spivak, McClelland, Maier & Neustadt, L.L.P.

(57) ABSTRACT

A screw conveyor for conveying an object to be conveyed, supported by a casing 1 by rotation of a screw 2, in which wear of a screw blade and decrease in conveyance efficiency are prevented without the need for extra power. Load on an electric motor 3 or the like for rotating the screw 2 or a value corresponding to the load is measured, and if the value is equal to or larger than a preset upper limit value, a screw shaft 2a is lifted up to increase a gap between an edge of the screw blade 2b and a bottom portion of the casing 1.

10 Claims, 4 Drawing Sheets

FOREIGN PATENT DOCUMENTS

| | | |
|---|---|---|
| JP | 2001 133165 | 5/2001 |
| JP | 2002-19948 | 1/2002 |
| JP | 2002 080118 | 3/2002 |
| JP | 2004-25170 | 1/2004 |
| SU | 1465404 A1 | 3/1989 |
| WO | WO 2004/007031 A1 | 8/2004 |

OTHER PUBLICATIONS

Office Action issued Nov. 2, 2010, in Japan Patent Application No. 2004-336029 (with English translation).

* cited by examiner

SCREW CONVEYOR AND OPERATION CONTROL METHOD FOR THE SAME

TECHNICAL FIELD

The present invention relates to a screw conveyor and an operation control technique for use therewith suitable for a movable hearth type discharger and the like.

BACKGROUND ART

In general, a screw conveyor conveys and supplies an object to be conveyed that has been introduced in a casing, by rotation of a screw. However, if highly adherent particulate matter is conveyed as the object to be conveyed by the screw conveyor, the particulate matter may be deposited on and become adhered to the bottom portion of the casing, resulting in production of a rigidly settled object. Due to this, an edge of a screw blade may be subjected to wear when contacting the settled object, and conveyance efficiency may be decreased due to an increase in torque. In some cases, a supporting base such as a bearing block for supporting the screw may be damaged, and the conveyance may be impossible.

To solve this problem, in a known example of a screw conveyor, a screw conveyor chips off the deposited and adhered particulate matter by lifting the screw shaft during rotation to prevent a rigidly settled object from being produced.

Also in a screw discharger used for discharging reduced iron from a movable hearth type reduction furnace, there has been provided a method of lifting up a screw in accordance with the thickness of a settled object produced on a movable hearth. Accordingly, the screw may be prevented from being subjected to wear, and a discharge efficiency many be maintained, thereby stabilizing the operation.

DISCLOSURE OF INVENTION

However, with the screw conveyor utilizing the combination of the rotational movement and the lifting movement of the screw shaft as described above the edge of the screw blade compresses the particulate matter adhered on the bottom surface of the casing when the screw is lowered. This may promote the setting of the object.

Also, with the method of lifting up the screw discharger in accordance with the thickness of the settled object produced on the movable hearth, it is necessary to estimate the thickness of the settled object on the basis of the amount of powder to be mixed in the reduction furnace. Thus, the control may not be suitable for the actual operation state. In particular, since the production state of the settled object may significantly vary depending on nor only the amount of powder to be mixed in the reduction furnace, but also the material property and the operation condition of the reduction furnace, the actual thickness of the settled object may be different from the estimated thickness of the settled object. Due to this, extra power is needed for unnecessarily lifting up the screw discharger when the actual thickness of the settled object is smaller than the estimated thickness, whereas the load on the screw is increased when the actual thickness of the settled object is larger than the estimated thickness, thereby possibly increasing the wear of the screw blade and decreasing the conveyance efficiency.

Accordingly, an object of the present invention is to prevent the wear of the screw blade and decrease in conveyance efficiency without the need for extra power. To attain this, the following configuration is employed.

The present invention provides an operation control method for a screw conveyor which includes an object supporting unit having a supporting portion or supporting an object to be conveyed at least from a lower side of the object, a screw having a screw shaft and a screw blade provided around the screw shaft, and disposed such that the screw blade is located near the supporting portion of the object supporting unit, and a driver unit for moving the object to be conveyed in a direction parallel to the screw shaft by rotation of the screw blade of the screw, and which has a screw lift-up space above the screw disposed near the supporting portion, the method including the steps of: measuring load on the driver unit or a value corresponding to the load; and lifting up the screw shaft to the screw lift-up space when the load reaches a previously set upper limit value, so as to increase a gap between an edge of the screw blade of the screw and the supporting portion of the object supporting unit.

Also, the present invention provides a screw conveyor including: an object supporting unit having a supporting portion for supporting an object to be conveyed at least from a lower side of the object; a screw having a screw shaft and a screw blade provided around the screw shaft, and disposed such that the screw blade is located near the supporting portion of the object supporting unit; a driver unit for moving the object to be conveyed in a direction parallel to the screw shaft by rotation of the screw blade of the screw; a screw lift-up space secured above the screw disposed near the supporting portion; a load measuring unit for measuring load on the driver unit; a control unit for outputting a predetermined signal when the load reaches a previously set upper limit value; and a screw lift-up unit for lifting up the screw shaft of the screw in response to the predetermined signal, so as to increase a gap between an edge of the screw blade of the screw and the supporting portion of the object supporting unit.

Preferably, the object supporting unit includes a casing, the screw being provided in the casing, and a cross section of the casing perpendicular to a conveyance direction of the object to be conveyed has a shape having a bottom portion for surrounding the lower and lateral sides of the object to be conveyed, and the screw lift-up space provided above the bottom portion. Alternatively, the casing may include a flat member that is moved substantially horizontally in a direction substantially perpendicular to a conveyance direction of the object to be conveyed.

Note that the above-mentioned "bottom portion of the casing" means a surface of a portion contacting the object to be conveyed, or a surface of a portion possibly contacting the screw blade, and it is not limited to a portion at the lowermost position. In particular, for the bottom portion having the shape surrounding the lower and lateral sides of the object to be conveyed, not only the portion at the lowermost positions, but also a certain portion located at the upper side of the lowermost position may be included in the bottom portion.

When the screw conveyor is provided in a movable hearth furnace having a movable hearth, the screw may be disposed near an upper surface of the movable hearth, so that the upper surface of the movable hearth may serve as the supporting portion of the object supporting unit. Note that "the upper surface of the movable hearth" means the surface of the hearth made from a refractory product or the like. When an object to be heat-processed is mounted on the hearth, or a deposit is produced on the hearth, the screw blade may contact such an object or a deposit.

In the present invention, when the driver unit is an electric motor, for example, torque or an electric current value of the electric motor may be measured as the value corresponding to the load on the electric motor.

For example, in a case where the screw shaft is supported at both ends of the screw shafts the screw shaft may be lifted up by lifting up one of the ends of the screw shaft, or by lifting up both ends of the screw shaft alternately one by one.

BEST MODE FOR CARRYING OUT THE INVENTION

Embodiments of the present invention are described below with reference to the drawings.

First Embodiment

Figure 1:
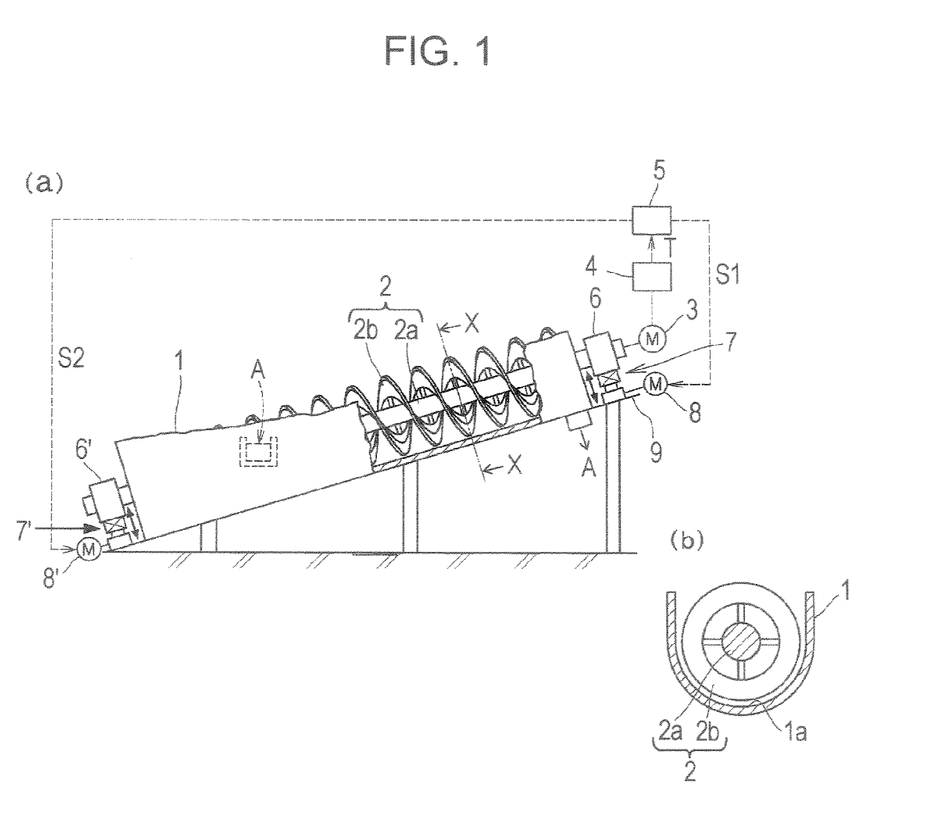
FIG. 1 is an illustration schematically showing a screw conveyor according to a first embodiment of the present invention, part (a) providing a front elevation, part (b) providing a cross section taken along line X-X.

FIG. 1 is a schematic explanatory illustration showing a screw conveyor according to a first embodiment of the present invention. As shown in part (a) of FIG. 1, the screw conveyor includes a casing 1 (object supporting unit) a screw 2 having a screw shaft 2*a* and a screw blade 2*b* mounted around the screw shaft 2*a*, an electric motor 3 (driver unit) for rotatably driving the screw shaft 2*a*, a torque measuring device 4 for measuring torque as load on the electric motor 3, a controller 5 (control unit) for outputting a predetermined signal when the torque measured by the torque measuring device 4 reaches a previously set upper limit value, and screw lifts 7 and 7' (screw lift-up units) for lifting up the screw shaft 2*a* in response to the signal output from the controller 5. The screw 2 is provided in the casing 1.

As shown in part (b) of FIG. 1, the cross section of the casing 1 perpendicular to a conveyance direction of an object A to be conveyed is shaped such that it is closed at the lower side and open at the upper side of the casing 1 (for example, being U-shaped as shown in the drawing). The enclosed portion defines a bottom portion 1*a* having a semicircular cross section. The bottom portion 1*a* supports the object A to be conveyed by surrounding the lower and lateral sides of the object A. Also, the casing 1 has a space for allowing the screw 2 to be lifted up, the space being provided above the bottom portion 1*a*.

The screw 2 is provided in the casing 1, at a position such that the lower edge of the screw blade 2*b* is located near the bottom portion 1*a* of the casing 1. When the screw shaft 2*a* of the screw 2 is rotated due to actuation of the electric motor 3, the screw blade 2*b* is rotated integrally with the screw shaft 2*a*, and the object A to be conveyed provided on the bottom portion 1*a* is conveyed in a direction parallel to the screw shaft 2*a*.

Bearing blocks 6 and 6' are mounted at both ends of the screw shaft 2*a*. The screw lifts 7 and 7' are interposed between a base 9 of the screw conveyor and the bearing blocks 6 and 6'. Namely, the screw lifts 7 and 7' support both ends of the screw shaft 2*a* to be rotatable, with the bearing blocks 6 and 6' interposed therebetween. The main bodies of the screw lifts 7 and 7' may expand and contract in the vertical direction. When the main bodies are driven by electric motors 8 and 8' for expansion and contraction, the screw shaft 2*a* is lifted with the bearing blocks 6 and 6'.

The controller 5 outputs predetermined signals to the electric motors 8 and 8' corresponding to the load on the electric motor 3 detected by the torque measuring device 4, so as to control the driving of the screw lifts 7 and 7', i.e., to control the lifting of the screw shaft 2*a*.

Next, the flow of an operation control of the screw conveyor according to this embodiment is described with reference to the flow chart of FIG. 2.

(1) Before the operation of the screw conveyor, the controller 5 sets a torque upper limit value $T_{max}$ for torque T of the electric motor 3, and an ascent amount Δh of the screw shaft 2*a*.

(2) During the operation of the screw conveyor, the torque measuring device 4 measures the torque T of the electric motor 3. Note that the torque may be measured continuously, or intermittently every predetermined period of time.

(3) The controller 5 acquires the measured torque T. Then, the controller 5 compares the measured torque T with the torque upper limit value $T_{max}$.

(4) The controller 5 outputs a signal S1 to one electric motor 8 only when $T \geq T_{max}$ in (3).

(5) The electric motor 8 which has received the signal S1 is automatically actuated, and lifts up one end of the screw shaft 2*a* with the bearing block 6 by the previously set ascent amount Δh.

(6) The torque T of the electric motor 3 is continuously or intermittently measured even after the one end of the screw shaft 2*a* is lifted up as described above.

(7) The controller 5 acquires the torque T. Then, the controller 5 compares the torque T with the torque upper limit value $T_{max}$.

(8) The controller 5 outputs a signal S2 to the other electric motor 8' only when $T \geq T_{max}$ in (7).

(9) The electric motor 8' which has received the signal S2 is automatically actuated, and lifts up the other end of the screw shaft 2*a* with the bearing block 6' by the previously set ascent amount Δh.

(10) By repeating operations (2) to (9), the ends of the screw shaft 2*a* are alternately lifted up one by one corresponding to an increment of the load on the electric motor 3.

While the driver unit for rotating the screw 2 is the electric motor 3, according to the present invention, the driver unit may be an engine or a steam turbine.

Also, the load on the electric motor 3 is not limited to the torque T. For instance, an electric current value may be measured. Alternatively, contact load between the screw 2 and the casing 1 with a settled object interposed therebetween may be measured as a value corresponding to the load on the electric motor 3.

Figure 2:
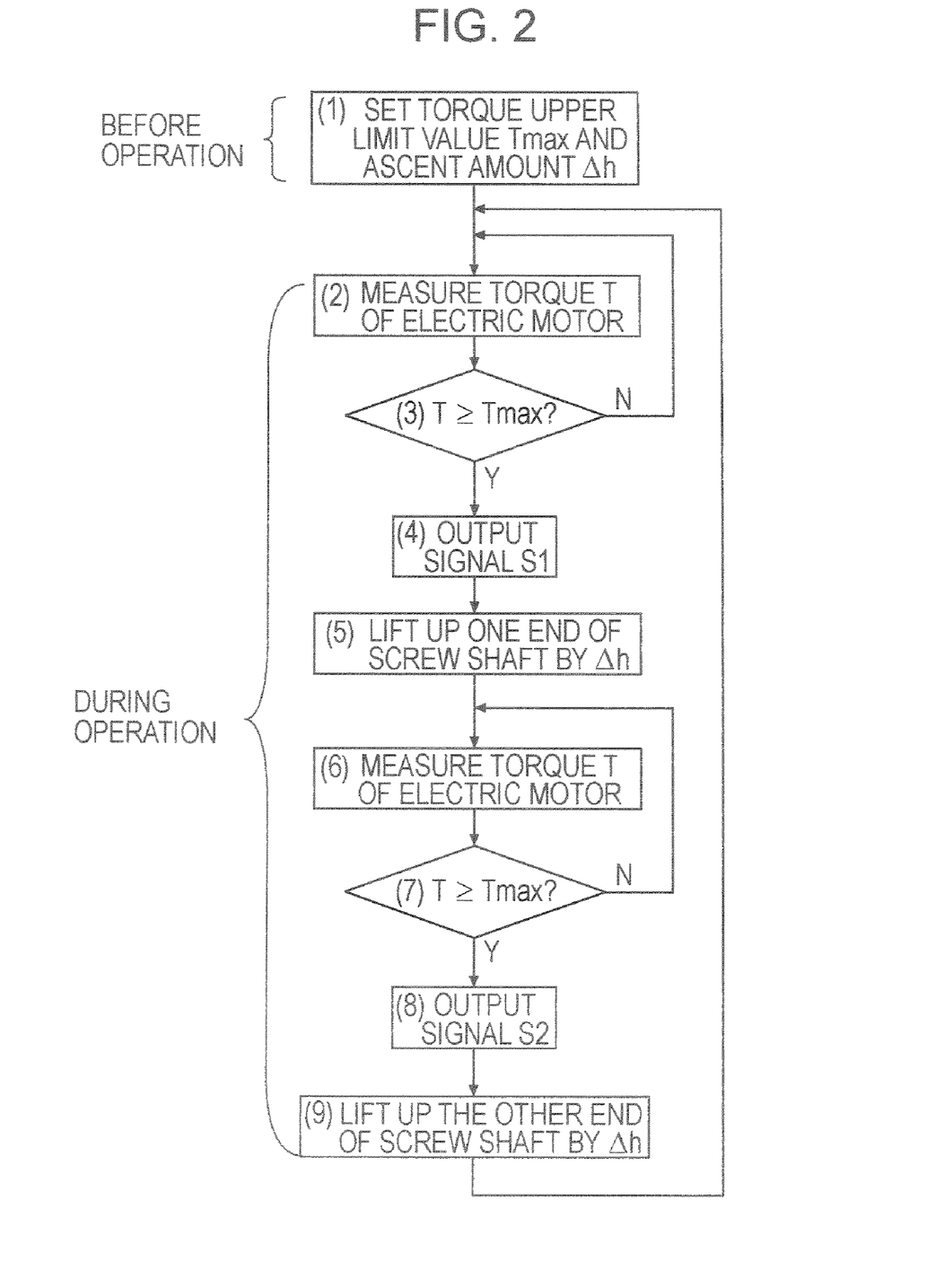
FIG. 2 is a control flow chart or an operation control method for the screw conveyor according to the first embodiment of the present invention.

While FIG. 2 shows an example in which the ends of the screw shaft 2*a* are alternately lifted up one by one, the one end of the screw shaft 2*a* may be repeatedly lifted up until the one end reaches a predetermined height, or both ends of the screw shaft 2*a* may be lifted up at the same time.

While FIG. 2 shows an example in which the one end of the screw shaft 2a is lifted up by the previously set ascent amount Δh when T≧$T_{max}$, for instance, the ascent amount may be varied corresponding to the degree of the excess torque T (=T−$T_{max}$) relative to the torque upper limit value $T_{max}$, or corresponding to the position of the screw shaft 2a. In this case, the controller may preferably output signals including information of the ascent amount instead of outputting the instruction signals S1 and S2, so that the screw lifts 7 and 7' including the electric motors 8 and 8' may be operated while position detectors provided at the screw lifts 7 and 7' detect lift positions of the screw lifts 7 and 7' in response to such signals.

In addition, drive sources of the screw lifts 7 and 7' may be electric chain blocks, hydraulic cylinders, or the like, instead of the electric motors 8 and 8'.

The cross section perpendicular to the conveyance direction of the casing 1 is not limited to being U-shaped as shown in the drawing, and it may be V-shaped. Also, the upper side of the casing 1 is not limited to being open, and the upper side may be closed so that the shape of the casing 1 defines a vertically long, ellipsoidal shape, as long as the casing 1 has a space (margin) that allows the screw 2 to be lifted up. In either case, the object to be conveyed may be stably conveyed since the bottom portion of the casing 1 surrounds the lower and lateral sides of the object to be conveyed.

Second Embodiment

Figure 3:
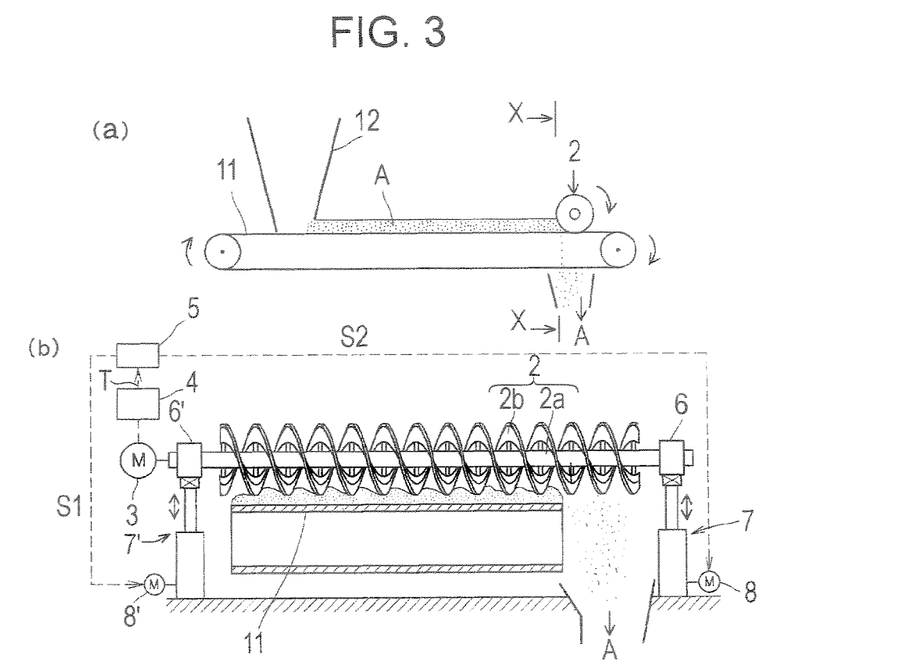
FIG. 3 is a schematic illustration showing a screw conveyor according to a second embodiment of the present invention, part (a) providing a longitudinal section, part (b) providing a cross section taken along line X-X.

FIG. 3 shows a screw conveyor according to a second embodiment of the present invention. This conveyor includes a flat member that is moved substantially horizontally in a direction substantially perpendicular to the conveyance direction of the object A to be conveyed (i.e., in a direction parallel to the screw shaft 2a) as an object supporting unit, instead of the casing 1 shown in FIG. 1. In particular, as an example suitable for the flat member, the conveyor includes a belt feeder 11 for supporting the object A to be conveyed on the belt and convey it in a belt-moving direction. In screw conveyor, the screw 2 is disposed such that the screw shaft 2a of the screw 2 extends in a direction substantially orthogonal to the belt-moving direction of the belt feeder 11, and the screw blade 2b is located near the upper surface of the belt of the belt feeder 11. The conveyor is used for scraping up the chipped object A to be conveyed out of a hopper 12 via the belt feeder 11, by using the screw 2, and supplying the object to the next process.

Using the control method similar to that of the first embodiment, the conveyor according to the second embodiment can prevent wear of the screw blade and decrease in conveyance efficiency due to the settled object produced at the belt feeder 11, without the need for extra power, by lifting up the screw 2 in accordance with the load on the electric motor 3 or the value corresponding to the load (torque, electric current value, or the like).

Third Embodiment

Figure 4:
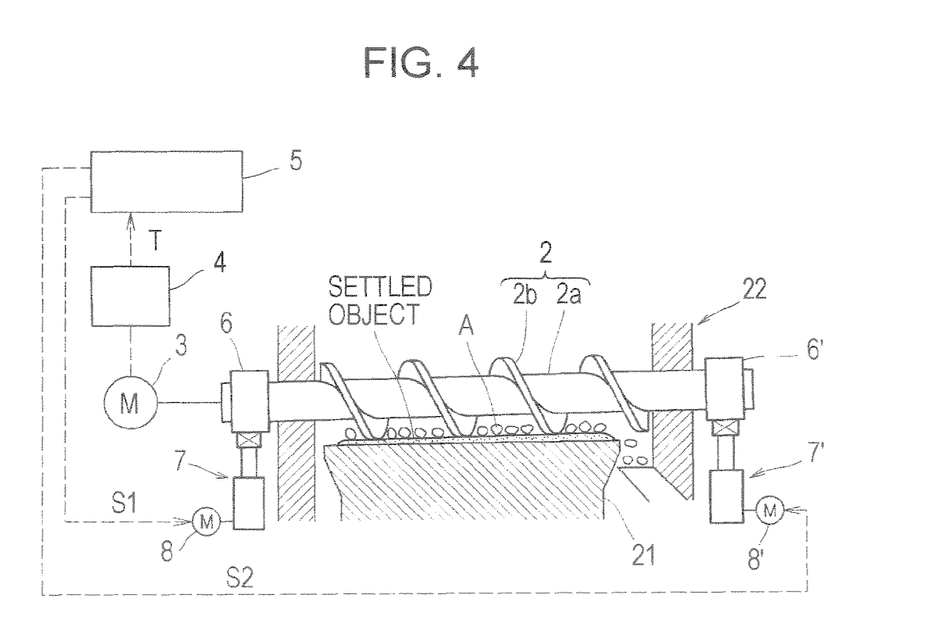
FIG. 4 is a front elevation schematically showing a screw discharger according to a third embodiment of the present invention.

In this embodiment, a screw conveyor according to the present invention is used as a discharger for a movable hearth furnace 22. The upper surface of a movable hearth 21 that is moved in the movable hearth furnace 22 defines a supporting portion of the object supporting unit. In particular, the screw discharger includes the screw 2 disposed such that the screw blade 2b is located near the upper surface of the movable hearth 21. As the screw blade 2b is rotated, an object A to be heat-processed (object to be conveyed), which is mounted on the movable hearth 21 and heat-processed during the movement thereof inside the movable hearth furnace 22, is conveyed in a direction parallel to the screw shaft 2a, and discharged to the outside of the movable hearth furnace 22.

Using the control method similar to that of the first and second embodiments, the conveyor according to the third embodiment can prevent wear of the screw blade and decrease in conveyance efficiency due to the settled object produced on the movable hearth 21, without the need for extra power, by lifting up the screw 2 in accordance with the load on the electric motor 3 (torque, electric current value, or the like).

Example 1

The screw conveyor and its operation control method according to the first embodiment shown in FIG. 1 were applied to a screw classifier that scrapes out iron oxide slurry using a screw from drain containing iron oxide powder.

Before the application of the present invention, since the gap between the casing 1 and the screw 2 was set to be a fixed distance during the operation the screw blade 2b seriously wore due to the settled object of the iron oxide slurry settled on the inner surface of the casing 1. The screw 2 was necessary to be replaced about every six months, or the screw blade 2b was necessary to be repaired by padding. As the settled object was increased, the load on the screw 2 was gradually increased, resulting in deterioration in conveyance capability. Consequently, the bearing blocks 6 and 6' were damaged.

In contrast, after the application of the present invention the screw blade 2b was prevented from being subjected to wear although the settled object was produced on the inner surface of the casing 1. Accordingly, the screw 2 was able to be used continuously for one year or more without repair. Also, the proper operation was continued for long time without the deterioration in conveyance capability. Further, since the excess increase of the load (torque, electric current value, or the like) of the electric motor 3 was prevented power consumption was able to be markedly decreased as compared with the case before the application of the present invention.

Figure 5:
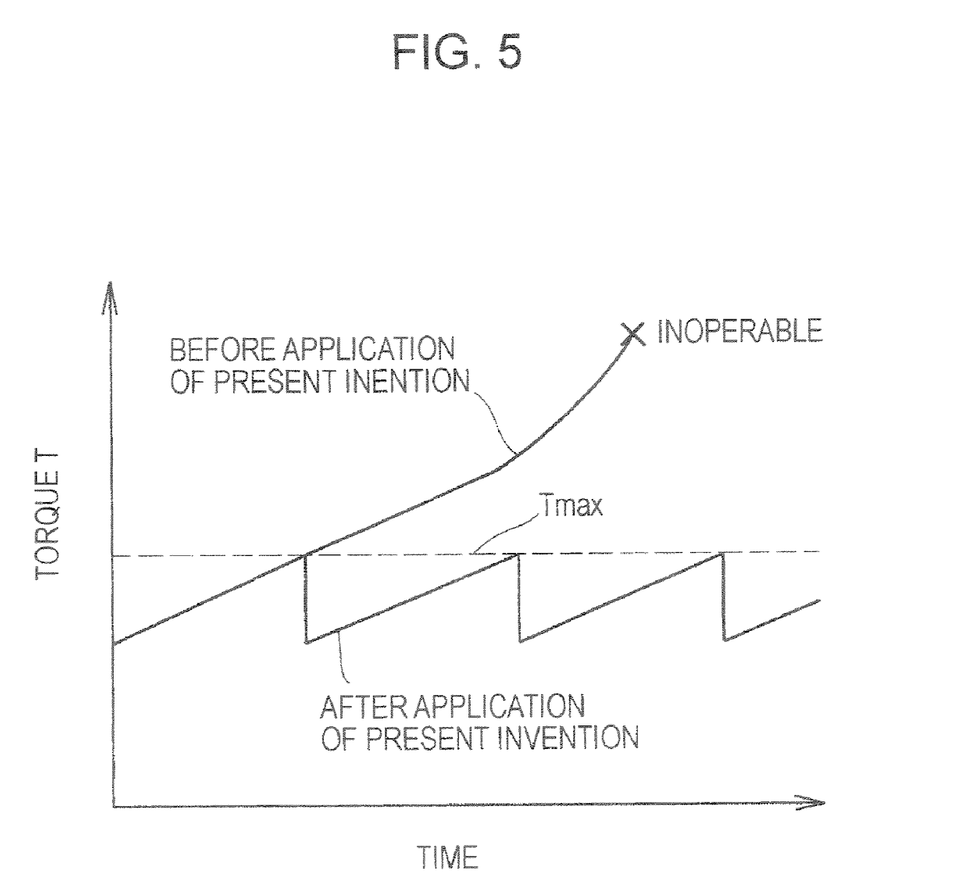
FIG. 5 is a graph showing variation in torque of an electric motor over time.

FIG. 5 schematically shows variation in torque T of the electric motor 3 over time, in cases of before and after the application of the present invention. Before the application of the present invention, the torque T was increased in a linear manner over time, and finally the torque T reached an inoperable state. In contrast, after the application of the present invention, the torque T was able to be constantly held at the torque upper limit value $T_{max}$ or smaller.

In the present example, a lifting range of the screw 2 was set to be 30 mm. The ascent amount Δh of the screw 2 when the torque T reached the torque upper limit value $T_{max}$ was set to be about 5 mm. In such a case, the position of the screw 2 reached the upper limit of the lifting range in about two weeks. Due to this, it was necessary to stop the operation and remove the settled object manually by an operator, or it was necessary to soften the settled object using a softener or the like, and then restore the position of the screw 2 to the lower limit position in the lifting range. When Δh was changed to 2 mm, the position of the screw 2 did not reach the upper limit of the lifting range even though the operation was continued for forty days. The position of the screw 2 only had to be restored to the lower limit position of the lifting range at every normal periodic repair. Further, when Δh was changed to 0.5 mm or smaller, the period necessary for that the position of the screw 2 reaches the upper limit of the lifting range was able to be extended to about three months at a maximum.

Smaller Δh, longer the period necessary for that the position of the screw 2 reaches the upper limit of the lifting range.

The reasons of this fact may be considered as follows. Even when the screw blade 2b contacts the settled objects, the torque T does not reach the torque upper limit value $T_{max}$ immediately. It is conceivable that the screw blade 2b compresses or chips off the settled object for a certain period, accordingly, the torque T may be gradually increased, and the torque T may finally reach the torque upper limit value $T_{max}$. Therefore, $\Delta h$ is set to be small to allow the screw to be lifted up little by little, so that the settled object which is newly adhered on the existing settled object may be chipped off while it is relatively soft. Accordingly, the settled object may be prevented from being increased.

Example 2

The screw conveyor and its operation control method according to the second embodiment shown in FIG. 3 were applied to an ore supplier that chips off ore powder. Similarly to Example 1, the wear of the screw 2 was prevented, the proper operation was able to be continued for long time without deterioration in the conveyance capability, and power consumption was able to be decreased markedly as compared with the case before the application of the present invention.

Example 3

The screw discharger and its operation control method according to the third embodiment shown in FIG. 4 were applied to a reduced iron discharger used for a rotary hearth type reduction furnace as a movable hearth furnace that produces reduced iron. Similarly to Examples 1 and 2, the wear of the screw 2 was prevented, the proper operation was able to be continued for long time without deterioration in the discharge capability, and power consumption was able to be decreased markedly as compared with the case before the application of the present invention.

INDUSTRIAL APPLICABILITY

The present invention may be used effectively for conveying various types of objects to be conveyed by using a screw.

The invention claimed is:

1. An operation control method for a screw conveyor which includes an object supporting unit having a supporting portion for supporting an object to be conveyed, at least from a lower side of the object, a horizontally extending screw having a screw shaft and a screw blade provided around the screw shaft, and disposed such that the screw blade is located near the supporting portion of the object supporting unit, and an electric motor as a driver unit for moving the object to be conveyed in a direction parallel to the screw shaft by rotation of the screw blade of the screw, and which has a screw lift-up space above the screw disposed near the supporting portion, the method comprising the steps of:

measuring the torque or an electric current value of the electric motor as a value corresponding to the load on the driver unit; and lifting up the screw shaft to the screw lift-up space when the load, determined according to the step of measuring the torque or an electric current value of the electric motor, reaches a previously set upper limit value, so as to increase a gap between an edge of the screw blade of the screw and the supporting portion of the object supporting unit.

2. An operation control method for a screw conveyor which includes an object supporting unit having a supporting portion for supporting an object to be conveyed, at least from a lower side of the object, a screw having a screw shaft and a screw blade provided around the screw shaft, and disposed such that the screw blade is located near the supporting portion of the object supporting unit, and an electric motor as a driver unit for moving the object to be conveyed in a direction parallel to the screw shaft by rotation of the screw blade of the screw, and which has a screw lift-up space above the screw disposed near the supporting portion, the method comprising the steps of:

measuring the torque or an electric current value of the electric motor as a value corresponding to the load on the driver unit; and lifting up the screw shaft to the screw lift-up space when the load, determined according to the step of measuring the torque or an electric current value of the electric motor, reaches a previously set upper limit value, so as to increase a gap between an edge of the screw blade of the screw and the supporting portion of the object supporting unit, wherein the object supporting unit includes a casing, the screw being provided in the casing, and a cross section of the casing perpendicular to a conveyance direction of the object to be conveyed has a shape having a bottom portion for surrounding the lower side and lateral sides the object to be conveyed, and the screw lift-up space provided above the bottom portion.

3. The operation control method for the screw conveyor according to claim 1, wherein the object supporting unit includes a flat member that is moved substantially horizontally in a direction substantially perpendicular to a conveyance direction of the object to be conveyed.

4. The operation control method for the screw conveyor according to claim 1, wherein the screw conveyor is provided in a movable hearth furnace having a movable hearth, as a screw discharger for discharging an object to be heat-processed that is mounted on an upper surface of the movable hearth and heat-processed during movement of the object in the movable hearth furnace, the screw is disposed near the upper surface of the movable hearth, and the upper surface of the movable hearth serves as the supporting portion of the object supporting unit.

5. The operation control method for the screw conveyor according to claim 1, wherein the screw shaft is supported at both ends of the screw shaft, and the screw shaft is lifted up by lifting up one of the ends of the screw shaft, or by lifting up both ends of the screw shaft alternately one by one.

6. A screw conveyor comprising:

an object supporting unit having a supporting portion for supporting an object to be conveyed at least from a lower side of the object;

a horizontally extending screw having a screw shaft and a screw blade provided around the screw shafts and disposed such that the screw blade is located near the supporting portion of the object supporting unit;

a driver unit comprising an electric motor for moving the object to be conveyed in a direction parallel to the screw shaft by rotation of the screw blade of the screw;

a screw lift-up space secured above the screw disposed near the supporting portion;

a load measuring unit for measuring a load on the driver unit by measuring an output torque or an electric current value of the electric motor;

a control unit for outputting a predetermined signal when the load, determined by measuring the torque or an electric current value of the electric motor in the load measuring unit, reaches a previously set upper limit value; and a screw lift-up unit for lifting up the screw shaft of the screw in response to the predetermined signal, so as to increase a gap between an edge of the screw blade of the screw and the supporting portion of the object supporting unit.

7. A screw conveyor comprising:

an object supporting unit having a supporting portion for supporting an object to be conveyed at least from a lower side of the object;

a screw having a screw shaft and a screw blade provided around the screw shafts and disposed such that the screw blade is located near the supporting portion of the object supporting unit;

a driver unit comprising an electric motor for moving the object to be conveyed in a direction parallel to the screw shaft by rotation of the screw blade of the screw;

a screw lift-up space secured above the screw disposed near the supporting portion;

a load measuring unit for measuring a load on the driver unit by measuring an output torque or an electric current value of the electric motor;

a control unit for outputting a predetermined signal when the load, determined by measuring the torque or an electric current value of the electric motor in the load measuring unit, reaches a previously set upper limit value; and a screw lift-up unit for lifting up the screw shaft of the screw in response to the predetermined signal, so as to increase a gap between an edge of the screw blade of the screw and the supporting portion of the object supporting unit, wherein the object supporting unit includes a casing, the screw being provided in the casing, and a cross section of the casing perpendicular to a conveyance direction of the object to be conveyed has a shape having a bottom portion for surrounding the lower side and lateral sides of the object to be conveyed, and the screw lift-up space provided above the bottom portion.

8. The screw conveyor according to claim 6, wherein the object supporting unit includes a flat member that is moved substantially horizontally in a direction substantially perpendicular to a conveyance direction of the object to be conveyed.

9. The screw conveyor according to claim 6, wherein the screw lift-up unit supports the screw shaft at both ends of the screw shaft, and lifts up the screw shaft by lifting up one of the ends of the screw shaft, or by lifting up both ends of the screw shaft alternately one by one.

10. A movable hearth furnace comprising:

a movable hearth, wherein the screw conveyor according to claim 6 is provided as a screw discharger for discharging an object to be heat-processed that is mounted on an upper surface of the movable hearth and heat-processed during movement of the object in the movable hearth furnace, the screw is disposed near the upper surface of the movable hearth, and the upper surface of the movable hearth serves as the supporting portion of the object supporting unit.

* * * * *